2,422,610

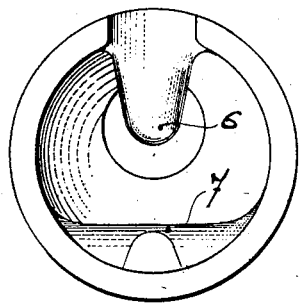
Fig. 2
Fig. 3
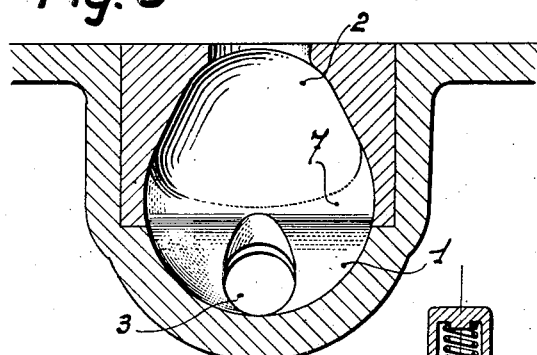
Fig. 4
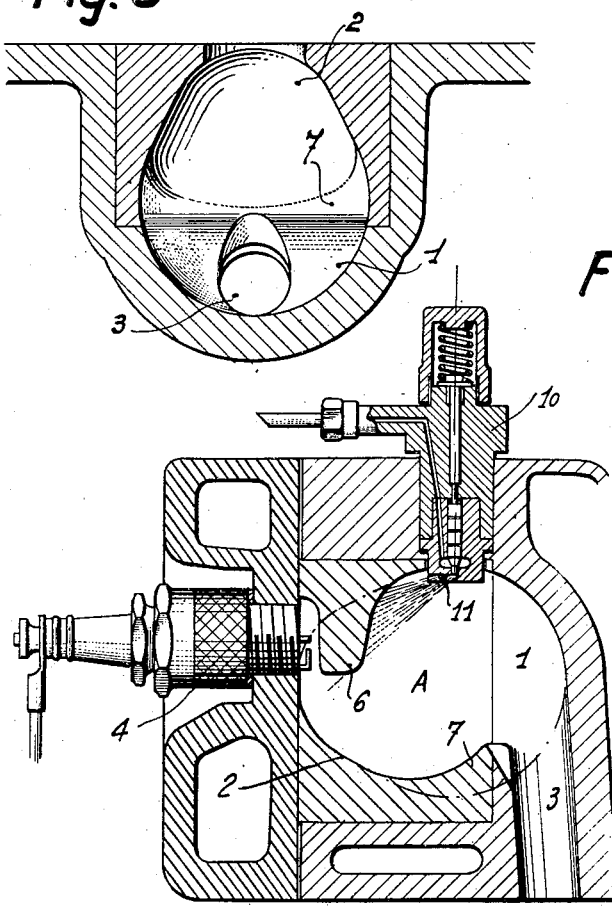
INVENTOR:
ALBERT BAGNULO
BY Haseltine Lake & Co
ATTORNEYS Patented June 17, 1947

UNITED STATES PATENT OFFICE 2,422,610

ENGINE WITH STRATIFIED MIXTURE

Albert Bagnulo, Rome, Italy; vested in the Attorney General of the United States Application October 26, 1938, Serial No. 236,981
In France October 27, 1937

Sections 3 and 14, Public Law 690, August 8, 1946.
Patent expires October 27, 1957

3 Claims. (Cl. 123—32)

This invention refers to internal combustion engines utilizing a hot bulb and spark plug.

The object of the invention is to provide an engine maintaining a high efficiency even at low load which is very flexible, robust, of normal weight and easy to manufacture.

This object is attained by improvements in engines of a known type having a hot bulb separated from the cylinder and operating with a medium compression ratio (of the order of 7:1 to 1:1), and ignition controlled by sparking plugs (or equivalent means). The result of improvements according to the invention is that the richness of the combustible mixture in the bulb gradually decreases in the direction from the sparking plug to the restricted passage connecting the interior of the bulb with the cylinder. This decreasing richness condition will be hereinafter referred to as a mixture stratification.

In such an engine, the pure air drawn into the cylinder, and the fuel is injected in atomised form into the combustion chamber either suction, or under pressure, according to the magnitude and the nature of the force of molecular cohesion of the fuel.

An engine of this type operates in accordance with the cycle of explosion engines. Consequently, in order to achieve the object of the present invention it will be necessary:

1. To direct the jet of fuel in such a manner that it is concentrated about the sparking plug.
2. To ensure, by suitable mixing, the formation of an explosive mixture without destroying the stratification.
3. To protect the sparking plug from being soaked with fuel and from excessive temperature.

These conditions are fulfilled by suitably positioning the injector and giving a predetermined form to the hot bulb. In the case of feeding under pressure, the jet is guided by a suitable inclination of the orifice of the injector, and in the case of feeding suction by means of a deflector disposed above the injection valve (see Figure 1). The hot bulb has on a cooled side a spherical or substantially spherical surface and on an uncooled side a spherical or substantially spherical surface of smaller diameter, these two surfaces being joined by a conical or concave surface, so that the entire chamber thus has a ovoidal profile; in addition, a projection is provided in the neighbourhood of the sparking plug to protect it from the jet of fuel directed towards the plug, while a second projection or deflector is disposed to assist in imparting a spiral movement to the gaseous mixture. In this way, there is imparted to the explosive mixture forced along by the air coming from the cylinder a centripetal spiral movement, the effect of which is to bring the richest zone of the mixture into contact with the sparking plug regardless of the quantity of fuel injected.

In the accompanying drawings, which illustrate by way of example a constructional embodiment of the invention:

Figure 2 illustrates the left-hand part of the pre-compression chamber seen in the direction of the arrows 2—2 of Figure 1; and Figure 3 is a section on the line 3—3 of Figure 1.

Figure 4 illustrates a modification of Figure 1.

Figure 1:
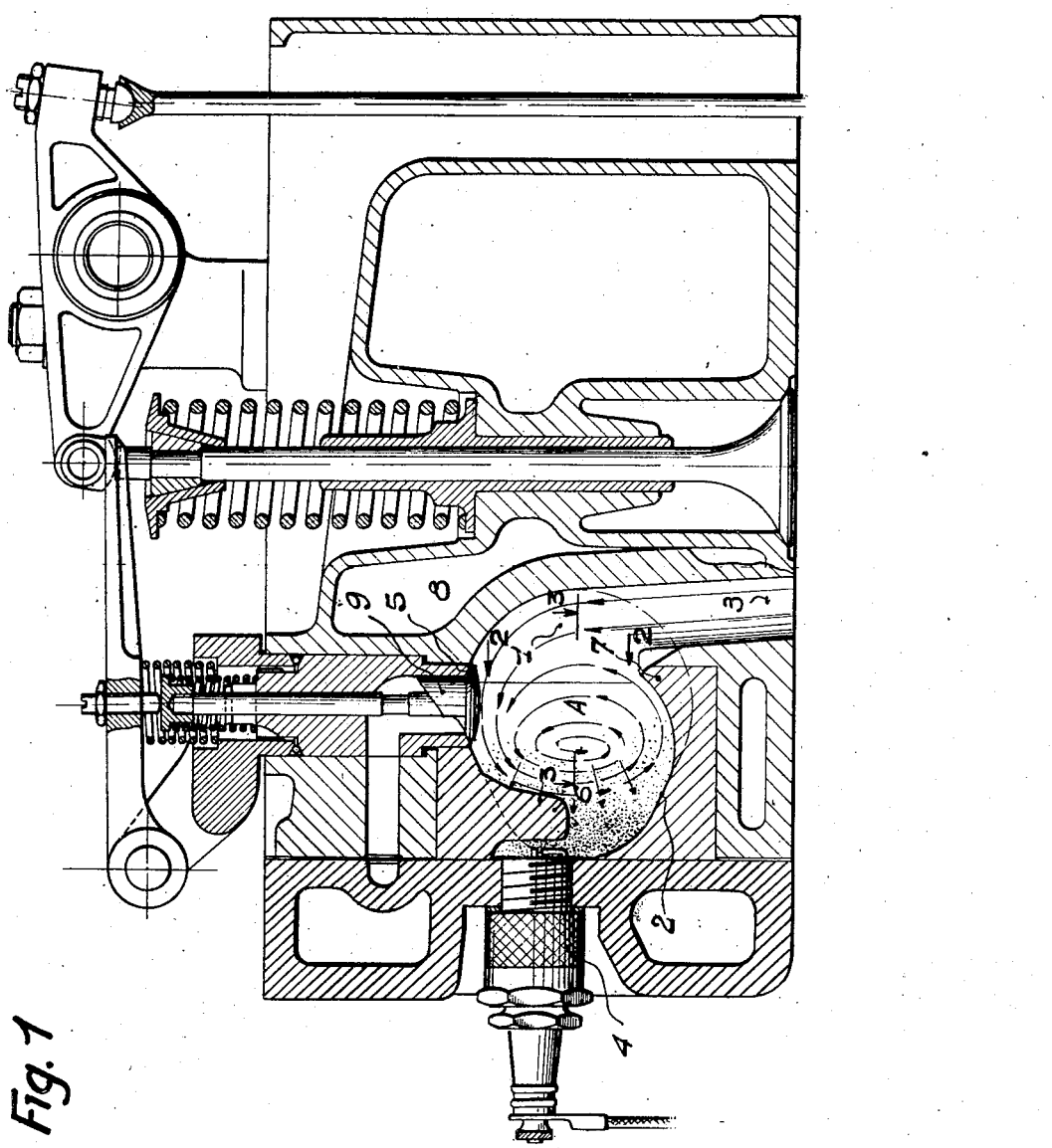
Figure 1 is a cross-sectional view of the cylinder head of an engine.

The hot bulb chamber A constitutes a cavity, the right-hand part 1 of which is of spherical form, while the left-hand part 2 has the form of a cone completed by a sphere of smaller diameter, the chamber as a whole being thus ovoidal. The port 3 for the admission of the air to the pre-combustion chamber is tangential with respect to the spherical part 1. The conical or tapered part 2, is disposed opposite to the air admission port 3 and lies at an angle of desired value thereto. The sparking plug 4 is secured in an orifice disposed at the end of the conical part 2. The injector 5 is disposed at the top of the spherical part 1 opposite to the port 3. This injector is formed, in the case of inlet of the fuel by suction, by a valve comprising a deflector 9, and in the case of the injection of fuel under pressure, by a device of a known type 10 (Figure 4), the orifice 11 of which is directed at a suitable angle.

A projection 6 extends downwards between the injector and the sparking plug in the neighbourhood of the point at which the generatrix of the cone tangentially meets the sphere 2, the said projection forming a screen which protects the sparking plug from the jet of fuel. A lip or deflector 7 extends from the lower surface of the hot bulb A in the region opposite the injector 5 and extends over the interior of the edge of the tangential air admission passage 3, the said lip or deflector adjacent the conical part of the hot bulb A having a thickness increasing over the whole width of the hot bulb in the direction of the intercommunication passage 3.

When the valve 5 opens, the combustible, which is very strongly projected in the liquid state towards the small extremity 2 of the hot bulb, accumulates there. The air charge which can eventually accompany the combustible from the time of the introduction thereof, executed a gyratory movement in a counterclockwise direction, in accordance with the arrangement illustrated in Figure 1. The combustible deposited on the hot wall of the hot bulb evolves vapour. The pure air, turned back across the tangential passage 3 assumes also a gyratory movement in the same direction as the first mentioned, but eccentrically in relation thereto, owing to the orientation of the air inlet and to the presence of the deflecting wall 7. Apart from that movement, the air which is continually driven back of the cylinder to the hot bulb compresses in the direction of the sparking plug the gaseous mixture previously introduced, the effect of which is to maintain the vapours in a region of the hot bulb which is relatively sheltered from the turbulent movement. It is to be noted that the gyratory movement of the air is appreciably delimited by a spherical surface formed by the large spherical side of the hot bulb and by the complement thereof in the space on the left of Figure 1. The small extremity of the hot bulb is thus relatively sheltered from the above-mentioned movement. The protuberance or projection 6 prevents the fouling of the sparking plug by the injection and flowing back of the combustible.

With the above form and arrangement of the hot bulb the engine can operate without regulation of the air, only the quantity of combustible introduced being varied. Upon slowing down, for example, when the quantity of combustible introduced is very small and the filling of the cylinder is complete, the operation is correct in spite of the great excess of air.

The stratification of the mixture is obtained by the combined effect of the form of the hot bulb and of the general arrangement of the constituent elements thereof assuring the proper direction of the jet of combustible; by the pressure of the turbulent air concentrating the combustible vapor in the small extremity of the hot bulb; and by the device for the deflection of the jet of combustible aside from the sparking plug.

It will thus be seen that at the instant of the explosion initiated at the sparking plug the flame advances over an increasing volume of the chamber and encounters zones of air of gradually increasing purity. The natural development of the flame is thus assisted and the formation of disruptive explosive waves such as occur in homogeneous mixtures is prevented.

The fuel consumption curve of such an engine shows a more accurate proportionality of the fuel consumption to the power developed, and oxidation phenomena due to delayed combustion owing to excess of air are avoided.

Moreover, means are provided for increasing the temperature of the interior of the pre-combustion chamber on the sparking plug side, since, the mixture being richer at this point, it is desirable to assist the gasification and to prevent condensation in this region. With this object in view, the left-hand half of the pre-combustion chamber is not provided with cooling means, but the right-hand part is cooled by means of recesses 8 through which circulates cooling water.

It should be noted that, since the richness of the mixture must be maintained above a certain value in the neighbourhood of the sparking plug in order for the mixture to be combustible, and having regard to the decrease in richness of the mixture away from this zone, an engine according to the invention may be considered as being insufficiently supplied with fuel, so that its maximum output, instead of being obtained in the neighbourhood of its highest speed of operation is produced between one third and two thirds of its range of operating speeds, which is particularly for the normal operating conditions of an automobile vehicle.

The engine may thus be rendered so flexible that the gear box may be dispensed with or simplified when the engine is utilised for the propulsion of land vehicles, while considerable advantages are obtained when the engine is employed for aircraft (operation during flight and operation on land). Moreover, when applied to the latter purposes, the engine according to the invention has the general advantage that due to the absence of a carburettor it eliminates the disadvantages due to freezing and the influence of atmospheric conditions on the binary and ternary mixtures, and that it considerably reduces the danger of fire even with highly inflammable fuels.

The invention is naturally capable of many different applications and modifications in construction apart from those referred to in the foregoing particular description which has been given in order to enable the nature and the scope of the invention to be readily understood.

What I claim is:

1. An internal combustion engine comprising at least one cylinder with piston, means to draw air into the said cylinder, a hot bulb of a generally ovoidal shape separated from the cylinder and interconnected therewith through a restricted passage opening tangentially with respect to the walls of the larger end of said bulb, means to introduce fuel into the said hot bulb in order to form therein, together with the air displaced by the piston through the passage, a combustible mixture, the said means comprising an injector the axis of which extends in a direction substantially perpendicular to the major axis of the ovoidal chamber, and a sparking plug mounted at the smaller end of the said ovoidal chamber.

2. An internal combustion engine comprising at least one cylinder with piston, means to draw air into the said cylinder, a hot bulb of a generally ovoidal shape separated from the cylinder and interconnected therewith through a restricted passage opening tangentially with respect to the walls of the larger end of said bulb, means to introduce fuel into the said hot bulb in order to form therein, together with the air displaced by the piston through the passage, a combustible mixture, the said means comprising an injector the axis of which extends in a direction substantially perpendicular, to the major axis of the ovoidal chamber, a sparking plug mounted at the smaller end of the said ovoidal chamber, and a projection located ahead of the sparking plug in order to protect same against the direct projections of fuel, the said projection having the form of a tongue, in a direction substantially perpendicular to the major axis of the said hot bulb, extending substantially as far as the said axis and having a mass sufficiently small to maintain, by radiation of its heat, a very hot atmosphere in the neighbourhood of the sparking plug.

3. An internal combustion engine comprising at least one cylinder with piston, means to draw air into the said cylinder, a hot bulb of a generally ovoidal shape separated from the cylinder and interconnected therewith through a restricted passage opening tangentially with respect to the walls of the larger end of said bulb, means to introduce fuel into the said hot bulb in order to form therein, together with the air displaced by the piston through the passage, a combustible mixture, the said means comprising an injector the axis of which extends in a direction substantially perpendicular to the major axis of the ovoidal chamber, the thickness of the wall of the said hot bulb opposing the injector increasing progressively over the entire width of the hot bulb in the direction of the intercommunication passage and forming in the neighbourhood of same a thick projection, in order to apply to the combustible mixture a rotary motion and to direct it towards the smaller end of the ovoidal chamber, and a sparking plug mounted at the smaller end of the said ovoidal hot bulb.

ALBERT BAGNULO.

REFERENCES CITED

The following references are of record in the file of this patent:

UNITED STATES PATENTS

| Number | Name | Date |
|---|---|---|
| 2,003,311 | Ricardo | June 4, 1935 |
| 1,691,182 | Davol | Nov. 13, 1928 |
| 1,942,127 | Russell et al. | Jan. 2, 1934 |
| 1,967,243 | Hesselman | July 24, 1934 |
| 2,014,828 | Wirrer | Sept. 17, 1935 |
| 2,065,419 | Bagnulo | Dec. 22, 1936 |

FOREIGN PATENTS

| Number | Country | Date |
|---|---|---|
| 400,173 | Great Britain | Oct. 12, 1933 |